United States Patent
Maeda et al.

(10) Patent No.: US 11,993,210 B2
(45) Date of Patent: May 28, 2024

(54) IN-VEHICLE CAMERA FIXING STRUCTURE AND CASING ATTACHING METHOD

(71) Applicants: Kojima Industries Corporation, Toyota (JP); SUBARU CORPORATION, Tokyo (JP)

(72) Inventors: Yasushi Maeda, Toyota (JP); Kazuhiro Kawamoto, Toyota (JP); Keiichiro Ito, Toyota (JP); Keiji Onodera, Tokyo (JP); Satoshi Hasegawa, Tokyo (JP); Kouki Tsukui, Tokyo (JP); Keirai Jyou, Tokyo (JP); Daisuke Kanou, Tokyo (JP)

(73) Assignees: KOJIMA INDUSTRIES CORPORATION, Toyota (JP); SUBARU CORPORATION, Tokyo (JP)

(*) Notice: Subject to any disclaimer, the term of this patent is extended or adjusted under 35 U.S.C. 154(b) by 270 days.

(21) Appl. No.: 17/490,440

(22) Filed: Sep. 30, 2021

(65) Prior Publication Data
US 2022/0105879 A1    Apr. 7, 2022

(30) Foreign Application Priority Data
Oct. 2, 2020   (JP) ................................. 2020-167622

(51) Int. Cl.
    *B60R 11/04*   (2006.01)
(52) U.S. Cl.
    CPC .................................... *B60R 11/04* (2013.01)
(58) Field of Classification Search
    CPC .................. G03B 17/561; B60R 11/04; B60R 2011/0026; B60R 2011/0059
    See application file for complete search history.

(56) References Cited

U.S. PATENT DOCUMENTS

| 2017/0217382 A1 | 8/2017 | Gunes |
| 2017/0240120 A1 | 8/2017 | Krug et al. |

(Continued)

FOREIGN PATENT DOCUMENTS

| JP | 2015154327 A | 8/2015 |
| JP | 2017523088 A | 8/2017 |

(Continued)

OTHER PUBLICATIONS

JPO Notice of Reasons for Refusal for corresponding JP Application No. 2020-167622; dated Feb. 20, 2024; 11 pages.

*Primary Examiner* — Christopher E Mahoney
(74) *Attorney, Agent, or Firm* — CANTOR COLBURN LLP

(57) ABSTRACT

An in-vehicle camera fixing structure includes a casing that supports an in-vehicle camera, and a bracket that holds the casing below. The casing includes a fulcrum rod protruding forward, and a left shaft and a right shaft supported above the casing and extending in a lateral direction. The bracket includes a fulcrum support structure that swingably supports the fulcrum rod, left and right temporary shaft placement pieces, and left and right shaft fixing structures that fix the left shaft and the right shaft in front of the left and right temporary shaft placement pieces, respectively. When the casing is directed forward and the casing is attached to the bracket, the left and right temporary shaft placement pieces guide the left shaft and the right shaft forward, and guide the left shaft and the right shaft toward the bracket.

7 Claims, 16 Drawing Sheets

(56) References Cited

U.S. PATENT DOCUMENTS

| | | | | |
|---|---|---|---|---|
| 2017/0277020 A1* | 9/2017 | Kasai | ...................... | F16M 13/02 |
| 2018/0364076 A1* | 12/2018 | Matori | .................... | G01D 11/30 |
| 2019/0381953 A1 | 12/2019 | Ohsumi et al. | | |
| 2022/0281391 A1* | 9/2022 | Grasun | .................. | B60R 11/04 |

FOREIGN PATENT DOCUMENTS

| | | | | |
|---|---|---|---|---|
| JP | 2017171164 A | 9/2017 | | |
| JP | 2018165127 A | 10/2018 | | |
| JP | 2019006148 A | 1/2019 | | |
| JP | 2019507045 A | 3/2019 | | |
| WO | WO-2017132088 A1 * | 8/2017 | .............. | B60R 1/00 |
| WO | WO-2018180665 A1 * | 10/2018 | ............. | B60R 11/04 |

\* cited by examiner

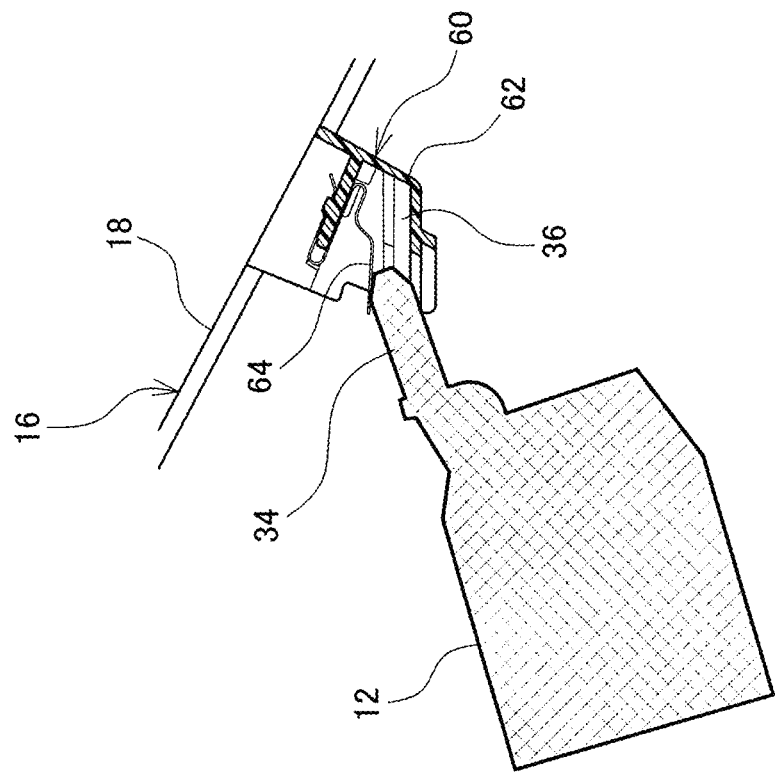
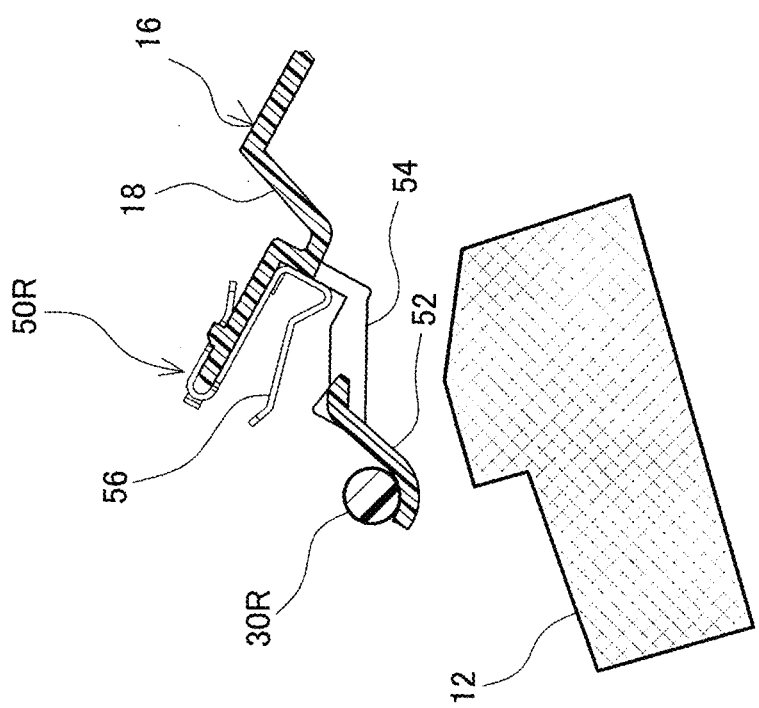
FIG. 14A
FIG. 14B

IN-VEHICLE CAMERA FIXING STRUCTURE AND CASING ATTACHING METHOD

CROSS REFERENCE TO RELATED APPLICATION

The present invention claims priority under 35 U.S.C. § 119 to Japanese Patent Application No. 2020-167622 filed on Oct. 2, 2020, the entire content of which is incorporated herein by reference.

TECHNICAL FIELD

The present disclosure relates to an in-vehicle camera fixing structure and a casing attaching method, and more particularly, relates to a structure and a method for fixing a casing of a camera to an automobile.

BACKGROUND

Some automobiles have a camera equipped on a vehicle interior side of a windshield. The camera is used, for example, to perform automatic travel control. In this case, the camera captures something serving as a reference of a travel route, such as a lane drawn on the road, and transmits video data to a travel control device. The travel control device performs automatic travel control based on the video data. In addition, the camera is sometimes used as a drive recorder.

JP 2015-154327 A describes a sensor unit provided on a vehicle interior side of a windshield. An in-vehicle camera is accommodated in a casing of the sensor unit, and the in-vehicle camera is supported by the casing. JP 2017-523088 A describes a support device that fixes at least one camera to a window glass of an automobile.

CITATION LIST

Patent Literature

Patent Literature 1: JP 2015-154327 A
Patent Literature 2: JP 2017-523088 A

SUMMARY

Technical Problem

As a structure for fixing a camera to a vehicle interior, there is a structure in which a casing in which a camera is accommodated is fixed to a bracket that is fixed to a windshield. However, depending on the structure of the casing, the place where the casing and the bracket are fixed is difficult for a worker to see, and the work of fixing the casing may be difficult.

An object of the present disclosure is to facilitate attachment of an in-vehicle camera.

Solution to Problem

The present disclosure includes: a casing that supports an in-vehicle camera; and a bracket that holds the casing below, in which the casing includes a fulcrum rod that protrudes forward, and a shaft that is supported above the casing and extends in a lateral direction, and the bracket includes a fulcrum support structure that swingably supports the fulcrum rod, an inclined surface structure that guides the shaft forward and guides the shaft toward the bracket when the casing faces forward and the casing is attached to the bracket, and a shaft fixing structure that forms the inclined surface structure and fixes the shaft in front of the inclined surface structure.

In one embodiment, the inclined surface structure is formed by a temporary shaft placement piece extending obliquely downward and rearward from the bracket.

In one embodiment, a tip end portion of the temporary shaft placement piece warps upward.

In one embodiment, the fulcrum support structure includes a reception hole that receives the fulcrum rod from behind, and a fulcrum spring piece that extends in the front-rear direction inside the reception hole and comes into contact with the fulcrum rod.

In one embodiment, the shaft fixing structure includes an arm portion that holds the shaft below the bracket, and a shaft spring piece that is attached to the bracket and urges the shaft between the shaft spring piece and the arm portion.

In one embodiment, the shafts are coaxially arranged on the left and right of the casing, the fulcrum rod is provided in front between the left and right shafts, and the bracket includes a pair of the inclined surface structures provided corresponding to the left and right shafts, and a pair of the shaft fixing structures provided corresponding to the left and right shafts.

The present disclosure is a casing attaching method by which a casing supporting an in-vehicle camera is attached to a bracket fixed to a vehicle interior, in which the bracket includes a fulcrum support structure that supports a tip end portion of a rod-shaped member extending in a front-rear direction, an inclined surface structure that guides a shaft member, that extends in a lateral direction, upward from a rear side toward a front side, and a shaft fixing structure that forms the inclined surface structure and fixes the shaft member in front of the inclined surface structure, and the casing attaching method includes a step of bringing a shaft provided above the casing into contact with the inclined surface structure, the shaft being the shaft member, a step of moving the shaft forward and upward along the inclined surface structure, a step of causing the fulcrum support structure to support a fulcrum rod protruding forward from the casing, the fulcrum rod being the rod-shaped member, and a step of fixing the shaft to the shaft fixing structure.

According to the present disclosure, attaching of an in-vehicle camera can be facilitated.

BRIEF DESCRIPTION OF DRAWINGS

Embodiment(s) of the present disclosure will be described based on the following figures, wherein:

FIG. 14A is a view showing a method of attaching the casing to the bracket;

FIG. 14B is a view showing a method of attaching the casing to the bracket;

DESCRIPTION OF EMBODIMENTS

Figure 1:
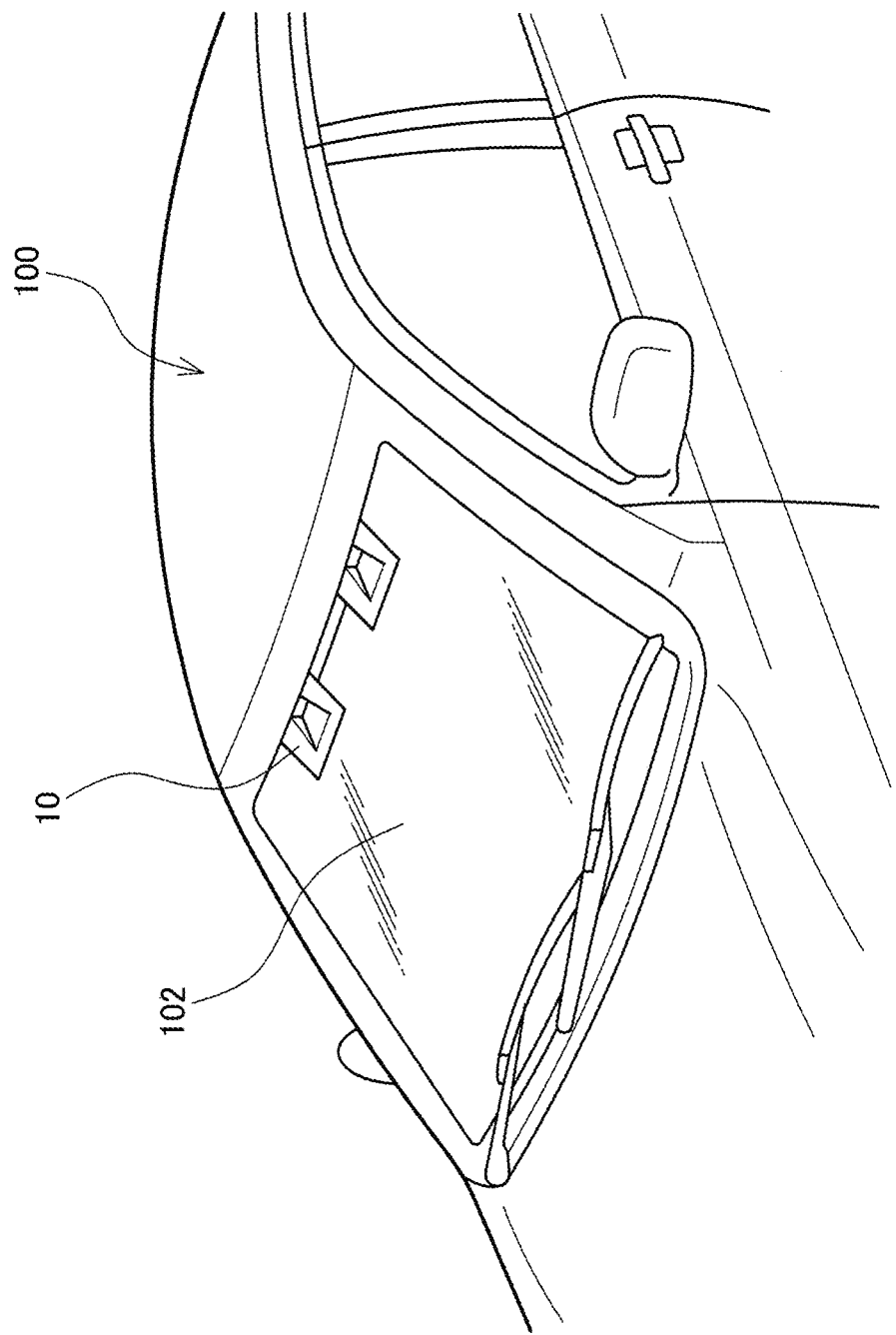
FIG. 1 is a view showing an automobile equipped with an in-vehicle camera unit.

An embodiment of the present disclosure will be described with reference to the drawings. The terms of up, down, left, right, front, and rear in the description of this application indicate directions viewed from the occupant of the automobile.

In addition, identical members shown in a plurality of drawings are given identical reference numerals, and the description thereof will be simplified.

FIG. 1 shows an automobile 100 equipped with an in-vehicle camera unit 10 according to an embodiment of the present disclosure. The in-vehicle camera unit 10 is fixed to an upper portion of a surface of a windshield 102 on the vehicle interior side. The in-vehicle camera unit 10 is used, for example, to perform automatic travel control. In this case, the in-vehicle camera unit 10 captures something serving as a reference of a travel route, such as a lane drawn on the road, and transmits video data to a travel control device. The travel control device performs automatic travel control based on the video data. In addition, the in-vehicle camera unit 10 may be used as a drive recorder. The in-vehicle camera unit 10 includes two cameras arranged side by side in the lateral direction of the automobile 100, and the two cameras constitute a stereo camera system. The stereo camera system is a system that can capture a three-dimensional image. Use of the three-dimensional image improves performance of the travel control device.

Figure 2:
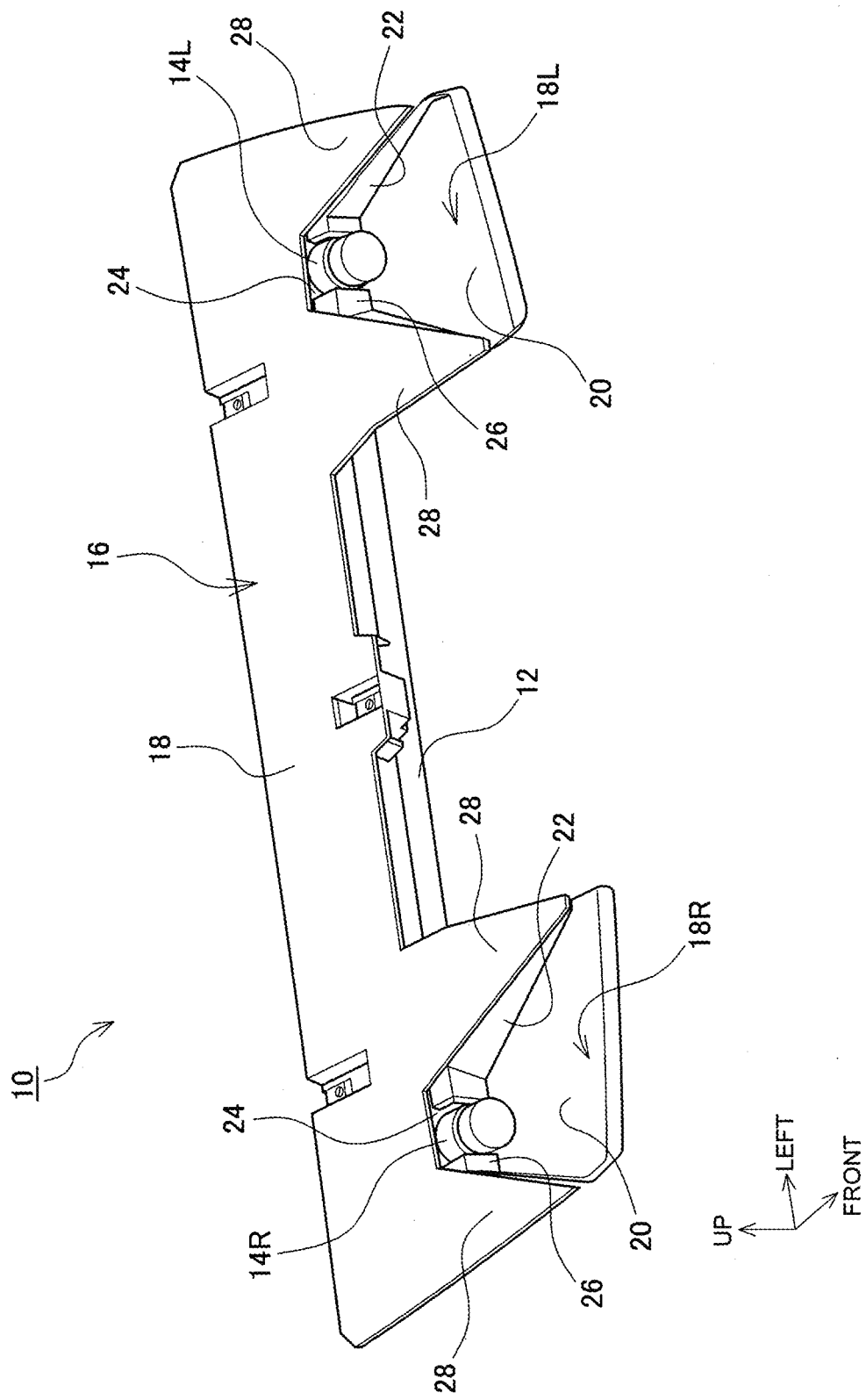
FIG. 2 is a perspective view of the in-vehicle camera unit.

FIG. 2 shows a perspective view of the in-vehicle camera unit 10 according to the embodiment of the present disclosure. In the in-vehicle camera unit 10, a bracket 16 holds a casing 12 below. That is, the in-vehicle camera unit 10 has a structure in which the casing 12 that accommodates and supports two left and right cameras 14L and 14R is fixed to the bracket 16 above the casing 12. A rear part of each of the cameras 14L and 14R may be accommodated in the casing 12, or the cameras 14L and 14R may be fixed to the front surface of the casing 12. The casing 12 may be detachable from the bracket 16. The two left and right cameras 14L and 14R constitute a stereo camera system. The bracket 16 is fixed in advance to the surface of the windshield 102 on the vehicle interior side. When the casing 12 is fixed to the bracket 16, the casing 12 is fixed to the vehicle interior.

Figure 3:
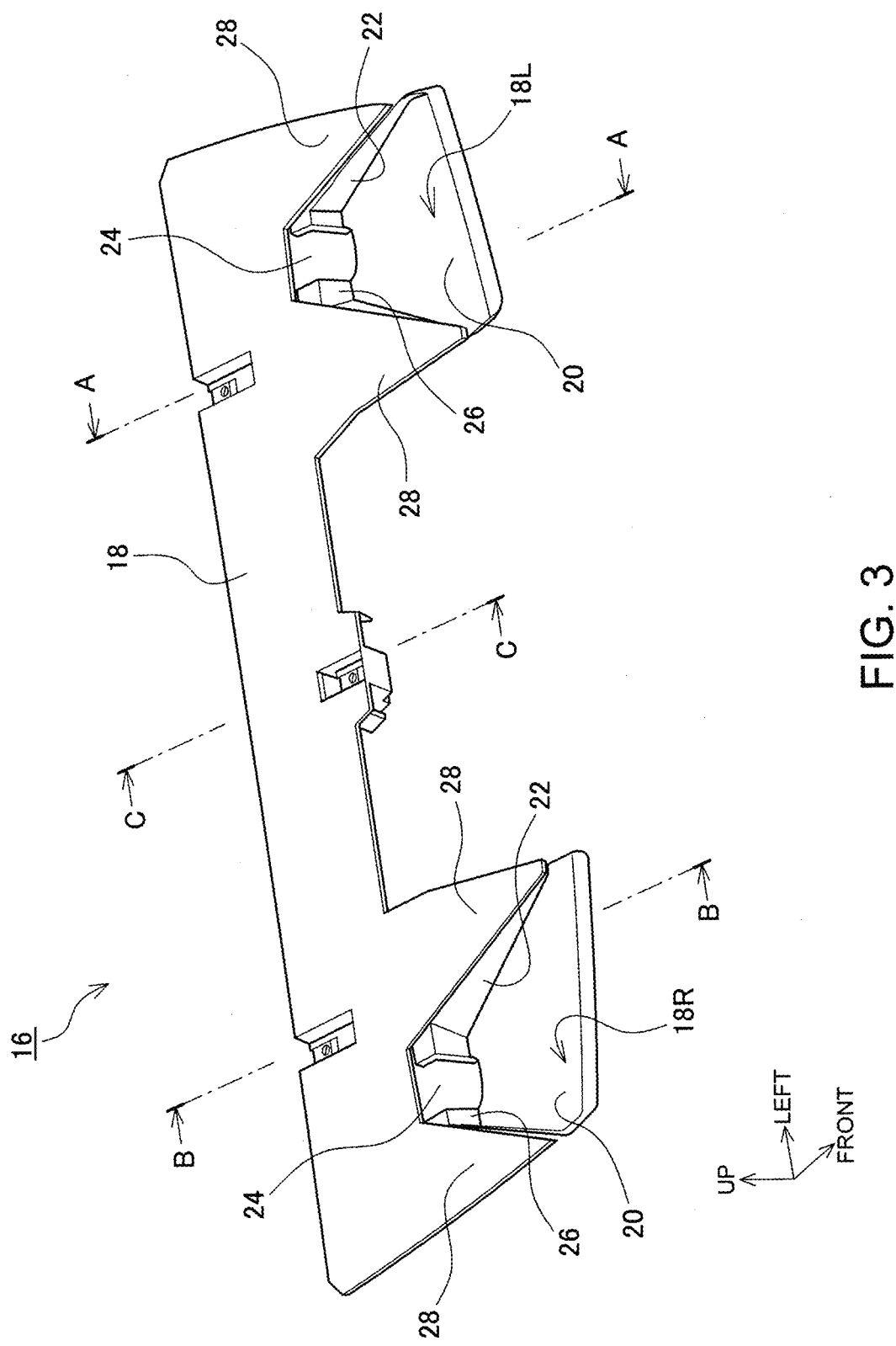
FIG. 3 is a view showing a bracket in a state where a casing is removed.

FIG. 3 shows the bracket 16 in a state where the casing 12 is removed. The bracket 16 includes a plate-shaped base portion 18 extending in the right-left direction and hood structures 18L and 18R formed at the left and right ends of the base portion 18. Each of the hood structures 18L and 18R is formed in a plate-shaped protrusion region 28 expanding forward on the left and right sides in the region of the base portion 18. A substantially trapezoidal notch is formed in the protrusion region 28, and a recess structure is formed downward from this notch. The recess structure is most deeply recessed at the rear end portion, becomes shallower toward the front while expanding in a folding-fan shape, and reaches the height of the protrusion region 28 at the front. That is, the recess structure includes a substantially trapezoidal bottom surface 20 inclined with the front being high, a substantially triangular side wall 22 rising from the left and right sides of the substantially trapezoidal bottom surface 20 and having the front as a vertex, and a rear wall 26 erected from the deepest portion on the rear side of the bottom surface 20. A camera hole 24 through which the camera 14L or 14R passes in the front-rear direction is formed in the rear wall 26. In a state where the casing 12 is removed from the bracket 16, the left and right camera holes 24 are in a state where the front and rear are viewable.

Note that the hood structures 18L and 18R may be formed integrally with the base portion 18, or may be individually formed as members different from the base portion 18. When the hood structures 18L and 18R are formed individually, the hood structures 18L and 18R are attached to the base portion 18 in the manufacturing process.

As shown in FIG. 2, in a state where the casing 12 is fixed to the bracket 16, the cameras 14L and 14R protrude forward from the left and right of the casing 12. The casing 12 is fixed to the bracket 16 such that the camera 14L penetrates the camera hole 24 on the left side of the bracket 16 and the camera 14R penetrates the camera hole 24 on the right side of the bracket 16. The fields of views of the camera 14L passes between the windshield 102 and the hood structure 18L, whereas the fields of views of the camera 14R passes between the windshield 102 and the hood structure 18R. The respective hood structures 18L and 18R block unwanted light for the cameras 14L and 14R.

Figure 4:
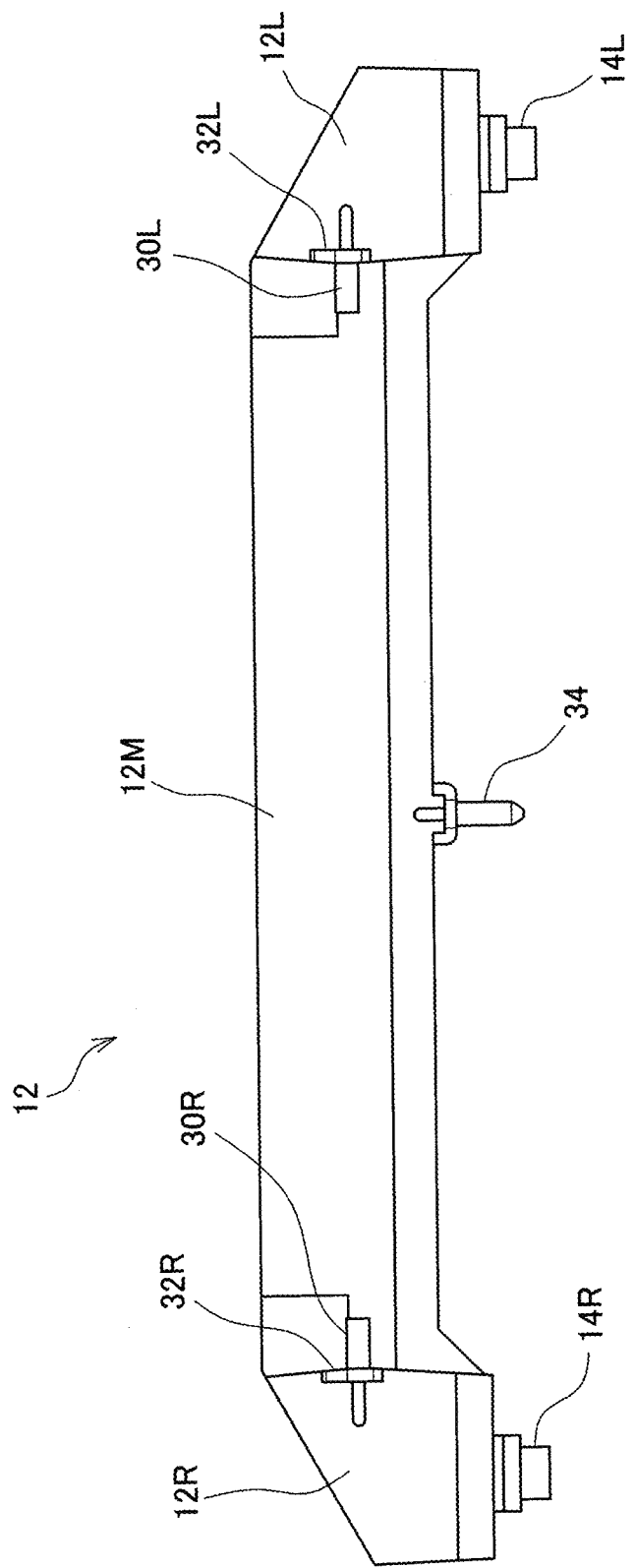
FIG. 4 is a top view of the casing.
Figure 5:
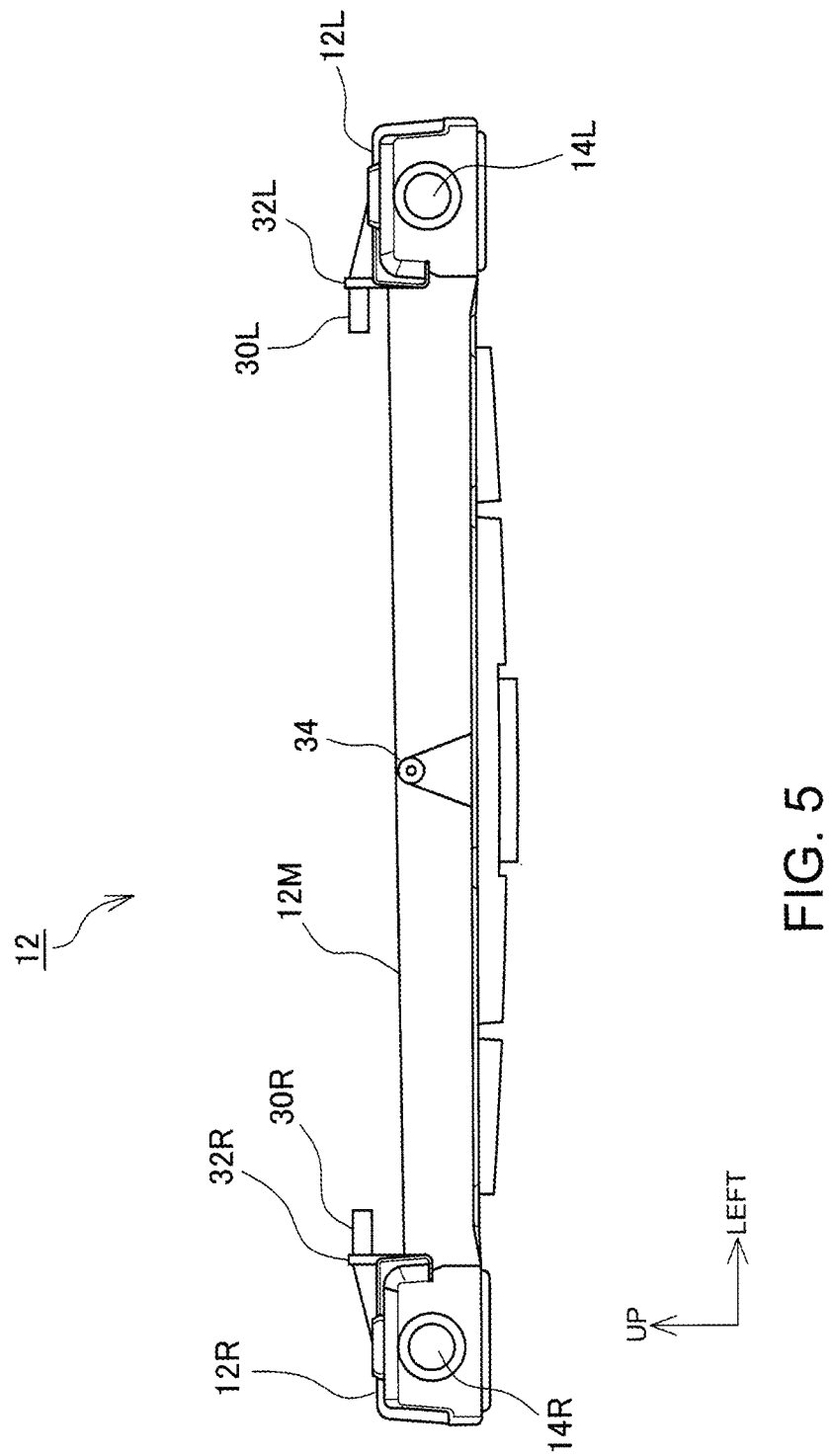
FIG. 5 is a front view of the casing.

FIG. 4 and FIG. 5 show a top view and a front view of the casing 12, respectively. The casing 12 includes a left casing 12L, a middle casing 12M, and a right casing 12R. The middle casing 12M is placed between the left casing 12L and the right casing 12R. The camera 14L protrudes forward from the front surface of the left casing 12L, and the camera 14R protrudes forward from the right casing 12R. A fulcrum rod 34 protrudes forward from above the central portion of the middle casing 12M.

From the vicinity of the boundary between the left casing 12L and the middle casing 12M, a shaft support piece 32L is erected upward, and a left shaft 30L protrudes rightward from the shaft support piece 32L. From the vicinity of the boundary between the right casing 12R and the middle casing 12M, a shaft support piece 32R is erected upward, and a right shaft 30R protrudes leftward from the shaft support piece 32R. Thus, the left shaft 30L and the right shaft 30R are supported by the shaft support pieces 32L and 32R, respectively, and are arranged coaxially to the left and right. The left shaft 30L and the right shaft 30R extend in the right-left direction at a position (above the casing 12) away from the upper surface of the casing 12. The fulcrum rod 34 is provided in front between the left shaft 30L and the right shaft 30R.

Figure 6:
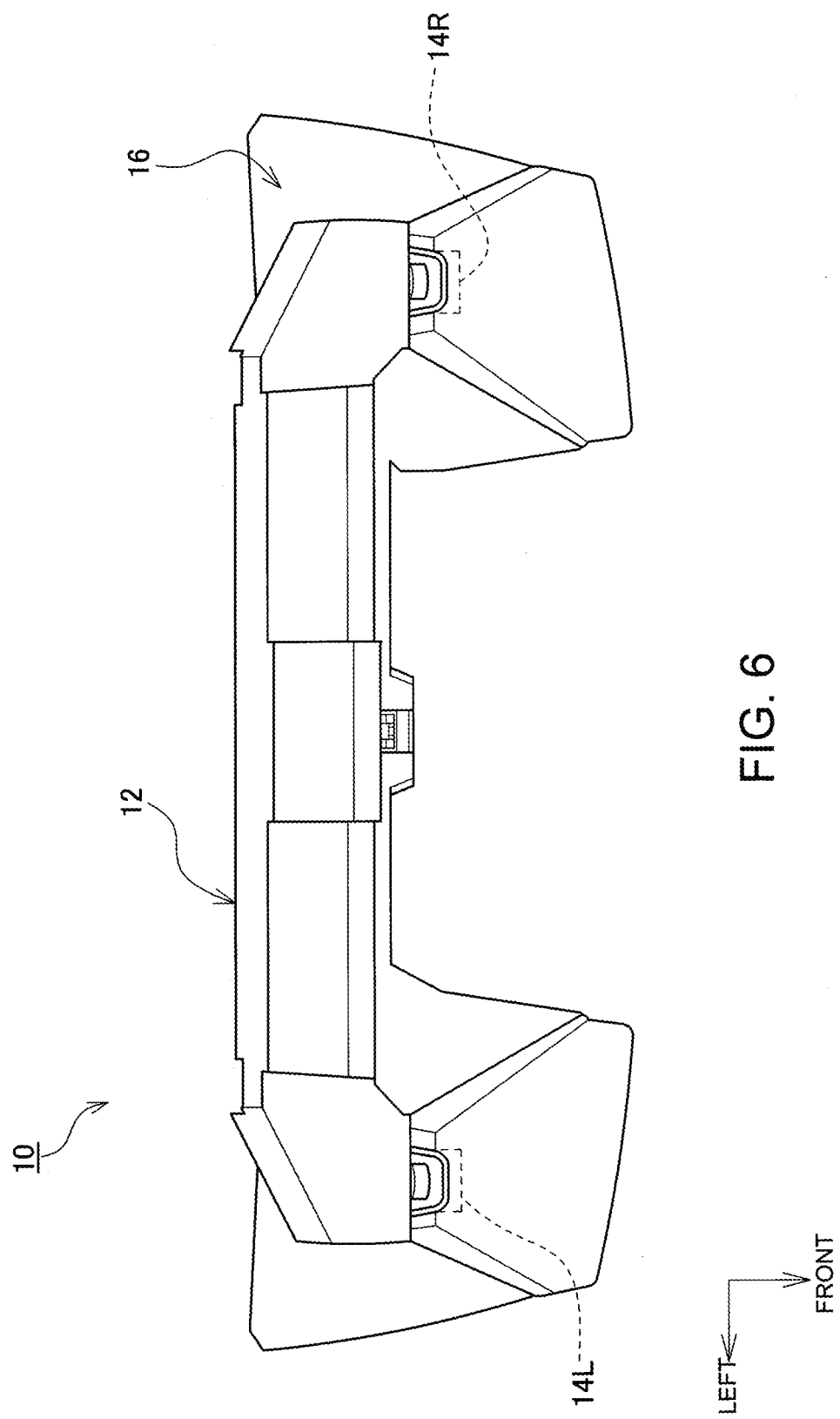
FIG. 6 is a bottom view of the in-vehicle camera unit.

FIG. 6 shows a bottom view of the in-vehicle camera unit 10 in a state where the casing 12 is attached to the bracket 16. The casing 12 is fixed to the lower side of the bracket 16, and the left and right cameras 14L and 14R penetrate the camera holes 24 on the left and right of the bracket 16.

Figure 7:
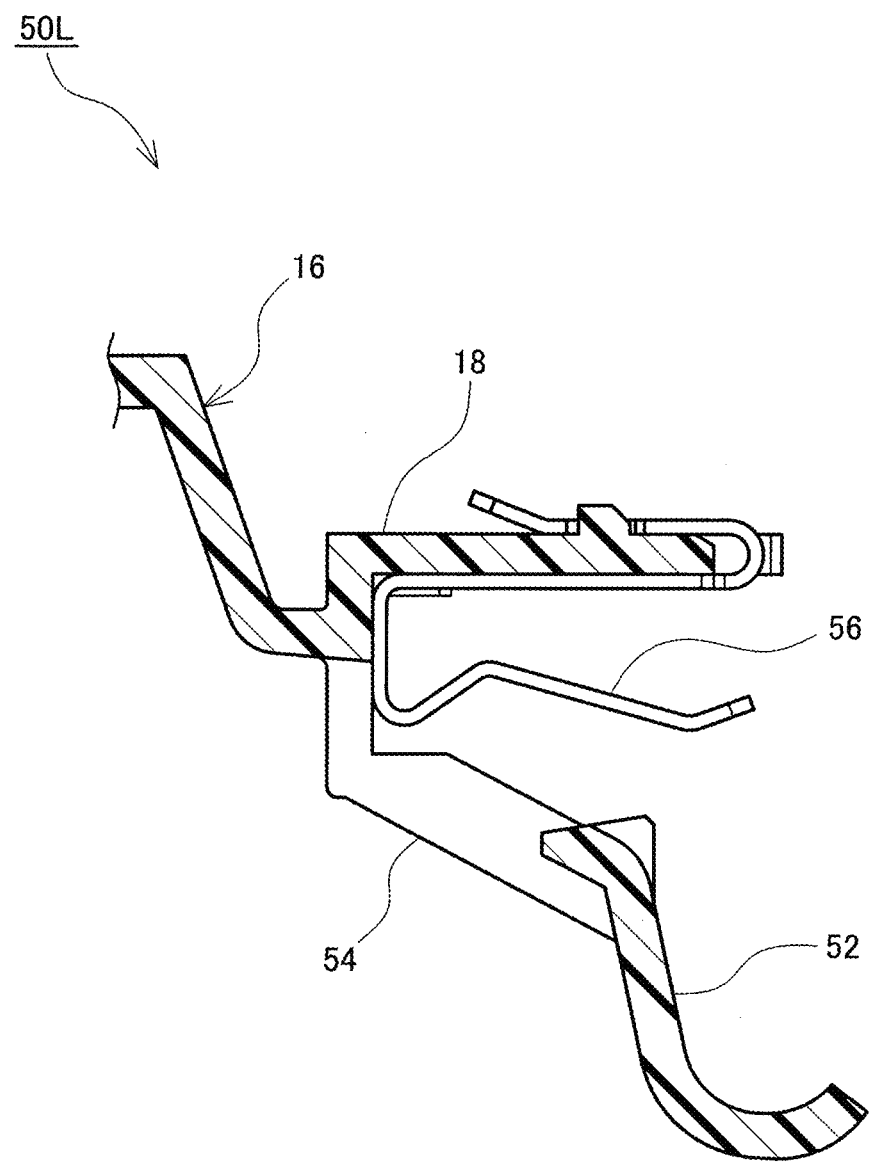
FIG. 7 is a view showing a part of a cross section taken along line AA of the bracket shown in FIG. 3.

FIG. 7 shows a part of a cross section that appears when the bracket 16 is cut along the line AA of FIG. 3. In this cross section, a shaft fixing structure 50L for fixing the left shaft 30L is shown. The shaft fixing structure 50L includes an arm portion 54 and a temporary shaft placement piece 52. The arm portion 54 holds the left shaft 30L below the bracket 16 when the casing 12 is attached. The arm portion 54 extends downward from the base portion 18 and then bends rearward. The temporary shaft placement piece 52 extends obliquely downward and rearward from the tip end of the arm portion 54. The upper surface of the temporary shaft placement piece 52 is inclined with the front being high while drawing a curved surface expanding downward, and an inclined surface structure is formed by the temporary shaft placement piece 52. The tip end portion of the temporary shaft placement piece 52 warps upward.

The shaft fixing structure 50L is further provided with a shaft spring piece 56 that urges the left shaft 30L between the shaft spring piece 56 and the arm portion 54 when the casing 12 is attached. The shaft spring piece 56 has a substantially S-shape extending rearward from the upper surface of the base portion 18, bending forward along the rear edge of the base portion 18, bending downward at the position where the arm portion 54 is formed, and bending rearward above the position where the arm portion 54 bends rearward. A section of the shaft spring piece 56 extending side by side with the arm portion 54 is elastically swingable about the front end of the section.

Figure 8:
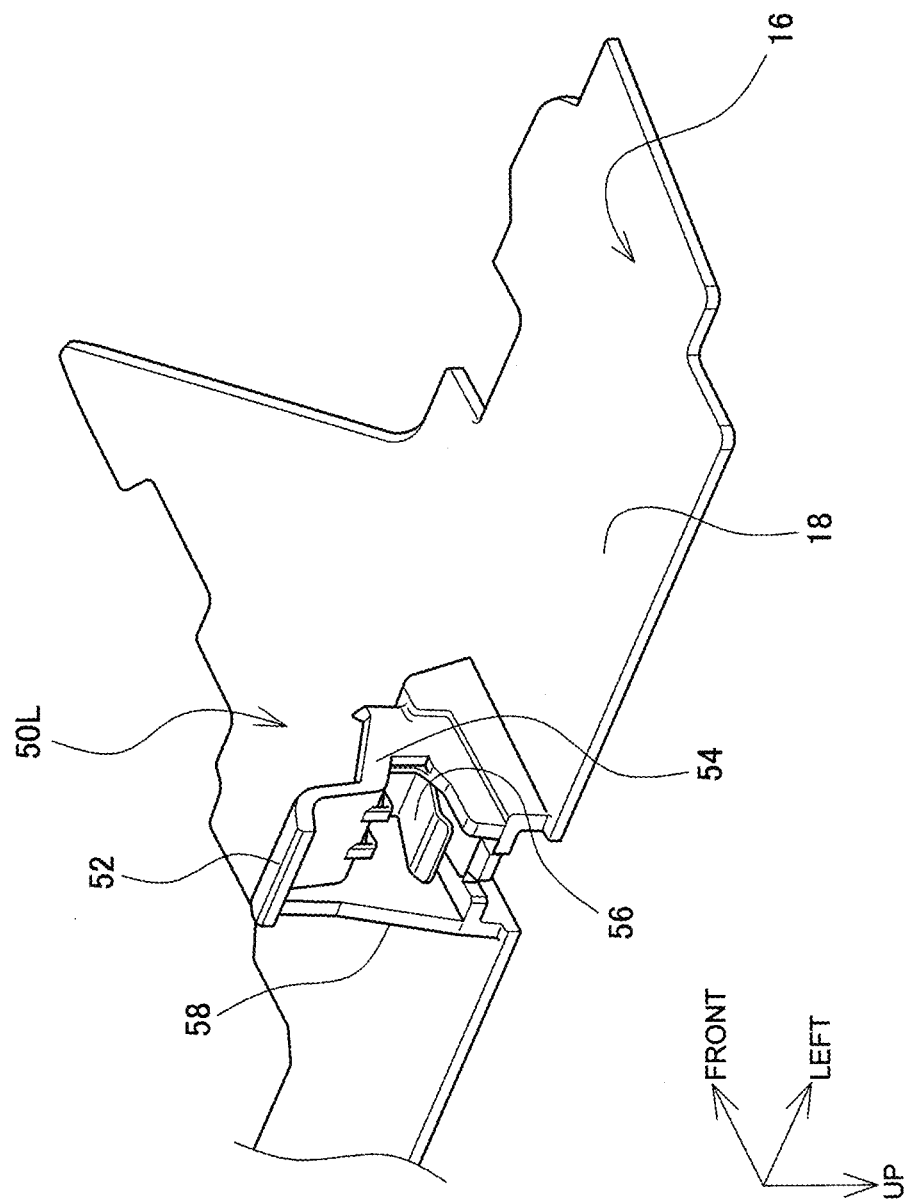
FIG. 8 is a perspective view of a shaft fixing structure as viewed from the obliquely lower rear left side.

FIG. 8 shows a perspective view of the shaft fixing structure 50L as viewed from the obliquely lower rear left side. As shown in FIG. 8, in the base portion 18, a region where the shaft fixing structure 50L is formed is recessed downward, and the arm portion 54 is formed in this recessed region. The space between the base portion 18 and the arm portion 54 is closed on the right side by a fixing structure wall 58, but is opened on the left side, and the left shaft 30L enters.

Figure 9:
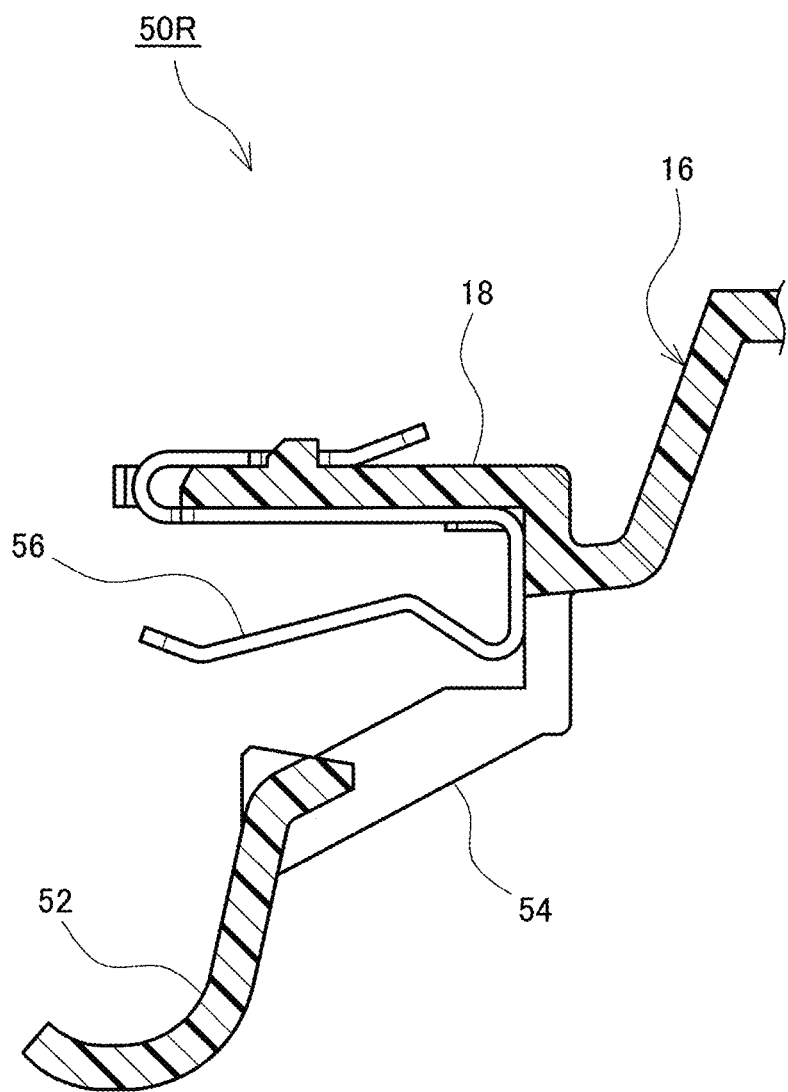
FIG. 9 is a view showing a part of a cross section taken along line BB of the bracket shown in FIG. 3.

FIG. 9 shows a part of a cross section that appears when the bracket 16 is cut along the line BB of FIG. 3. In this cross section, a shaft fixing structure 50R for fixing the right shaft 30R is shown. Since the structure of the shaft fixing structure 50R is symmetrical with respect to the shaft fixing structure 50L, the description thereof will be omitted.

Figure 10:
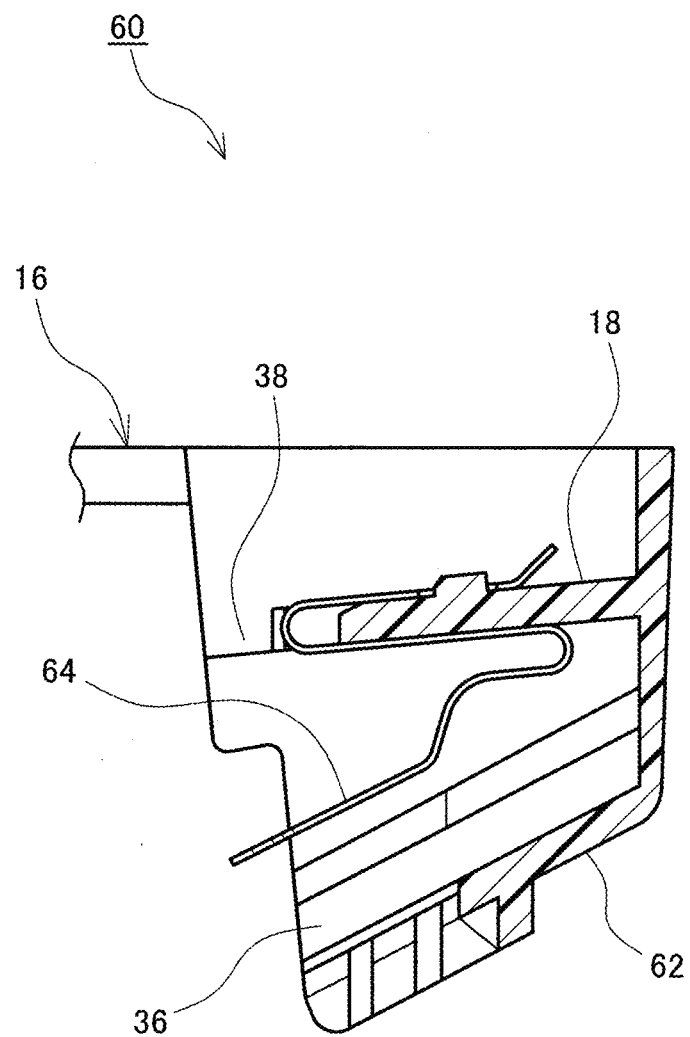
FIG. 10 is a view showing a part of a cross section taken along line CC of the bracket shown in FIG. 3.

FIG. 10 shows a cross section when the bracket 16 is cut along the line CC of FIG. 3. In this cross section, a fulcrum support structure 60 that supports the fulcrum rod 34 so as to be swingable with the tip end portion of the fulcrum rod 34 as a fulcrum is shown. The fulcrum support structure 60 has a semi-cylindrical portion 62 that covers a region below the base portion 18 and forms a reception hole 36 for receiving the fulcrum rod 34 from behind. That is, the semi-cylindrical portion 62 has a shape in which a cylindrical shape is cut in its axial cross section and the front is closed. The base portion 18 has a region recessed downward, and a hole 38 is provided in the region. The fulcrum support structure 60 is further provided with a fulcrum spring piece 64 that extends in the front-rear direction inside the reception hole 36 and comes into contact with the fulcrum rod 34 when the casing 12 is attached. The fulcrum spring piece 64 extends rearward from the upper surface of the recessed region of the base portion 18, bends forward along the edge of the hole 38, folds back rearward on the lower surface of the recessed region of the base portion 18, and extends rearward. A section of the fulcrum spring piece 64 folding back rearward is elastically swingable about the front end of the section.

Figure 11:
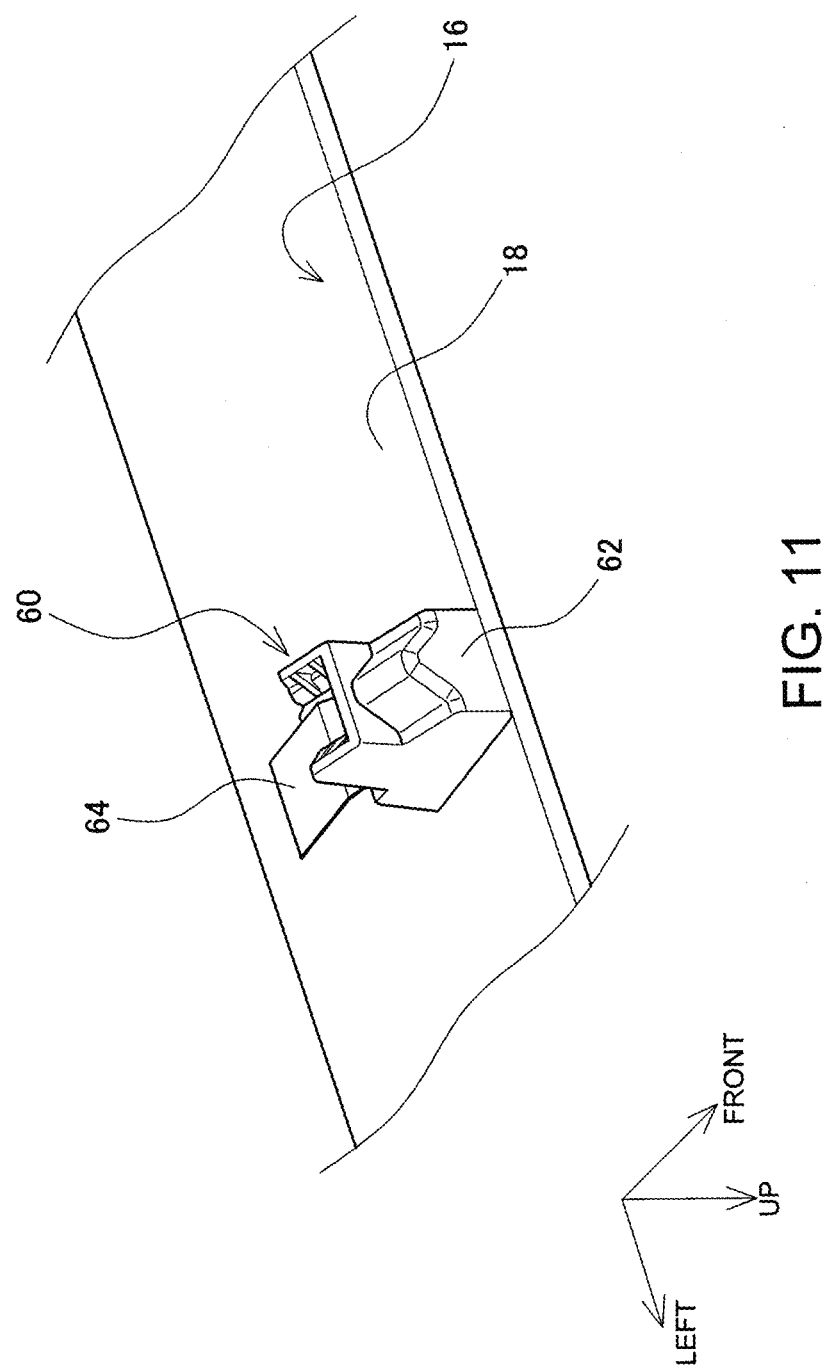
FIG. 11 is a perspective view of a fulcrum support structure as viewed from the obliquely lower front left side.
Figure 12:
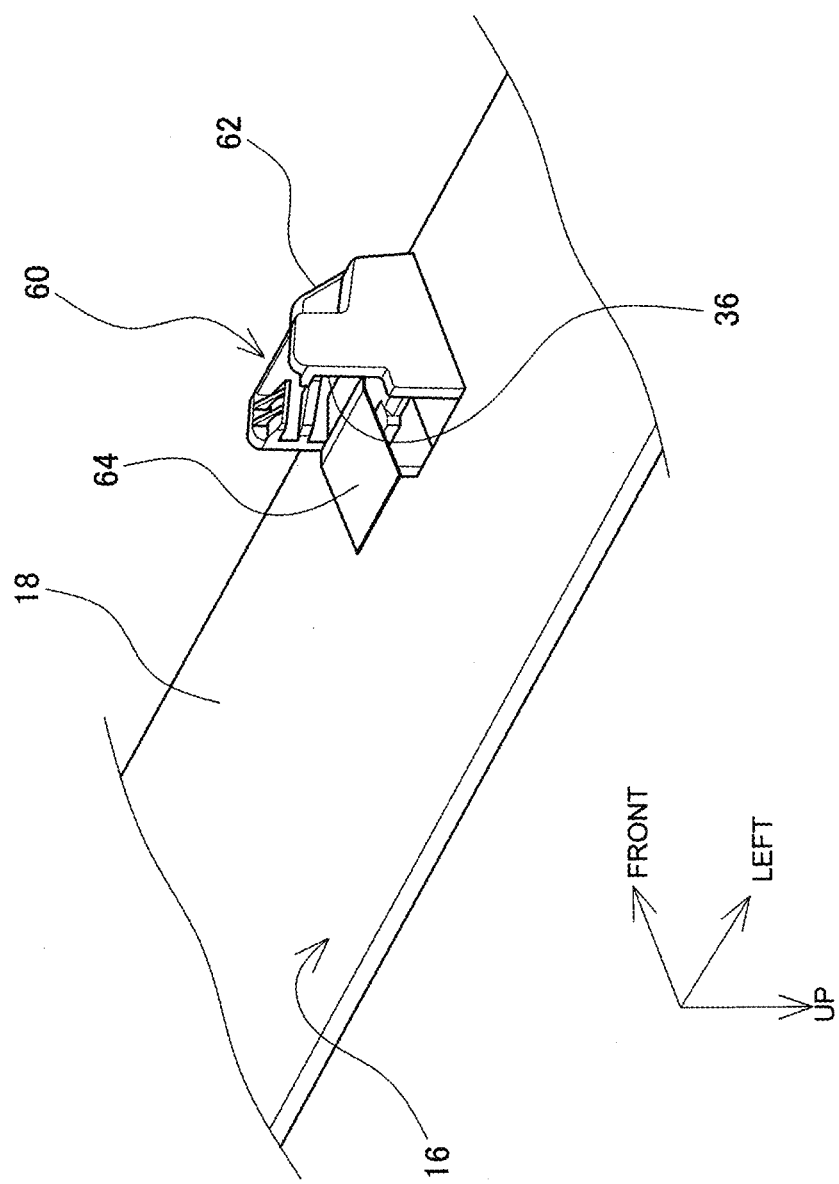
FIG. 12 is a perspective view of the fulcrum support structure as viewed from the obliquely lower rear left side.

FIG. 11 shows a perspective view of the fulcrum support structure 60 as viewed from the obliquely lower front left side. FIG. 12 shows a perspective view of the fulcrum support structure 60 as viewed from the obliquely lower rear left side. As shown in these figures, the fulcrum support structure 60 includes the semi-cylindrical portion 62 that covers the lower surface of the base portion 18, and the fulcrum spring piece 64 extends rearward from behind the semi-cylindrical portion 62.

A method of attaching the casing 12 to the bracket 16 will be described. FIG. 13A, FIG. 14A, FIG. 15A, and FIG. 16A schematically show a cross section when the in-vehicle camera unit 10 is cut at the position of the line BB of FIG. 3. The cross section when the in-vehicle camera unit 10 is cut along the line AA of FIG. 3 is a left-right inversion of these figures.

Figure 13B:
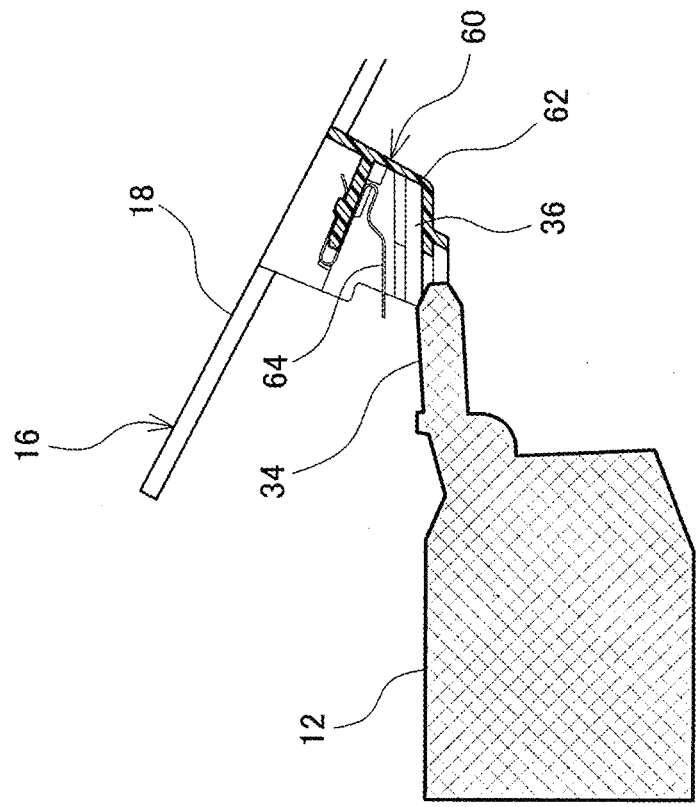
FIG. 13B is a view showing a method of attaching the casing to the bracket.
Figure 13A:
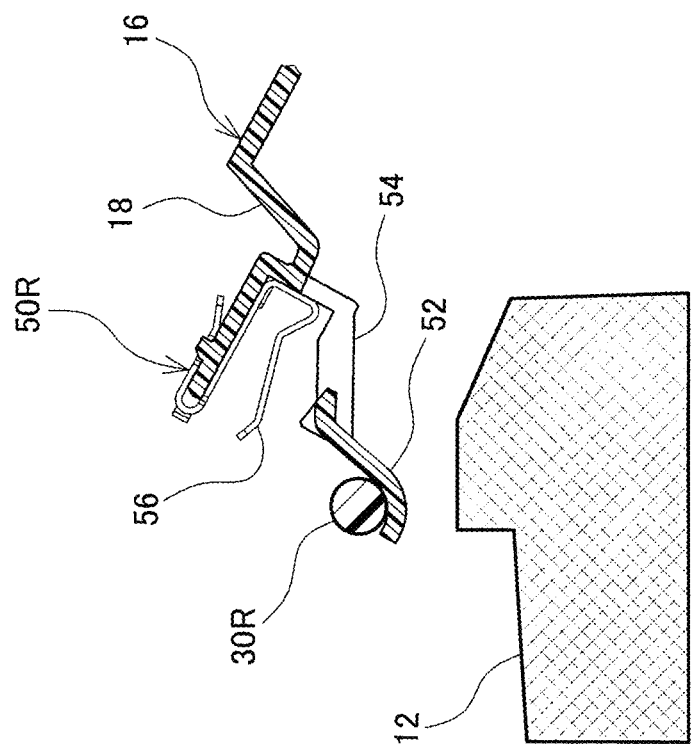
FIG. 13A is a view showing a method of attaching the casing to the bracket.
Figure 15B:
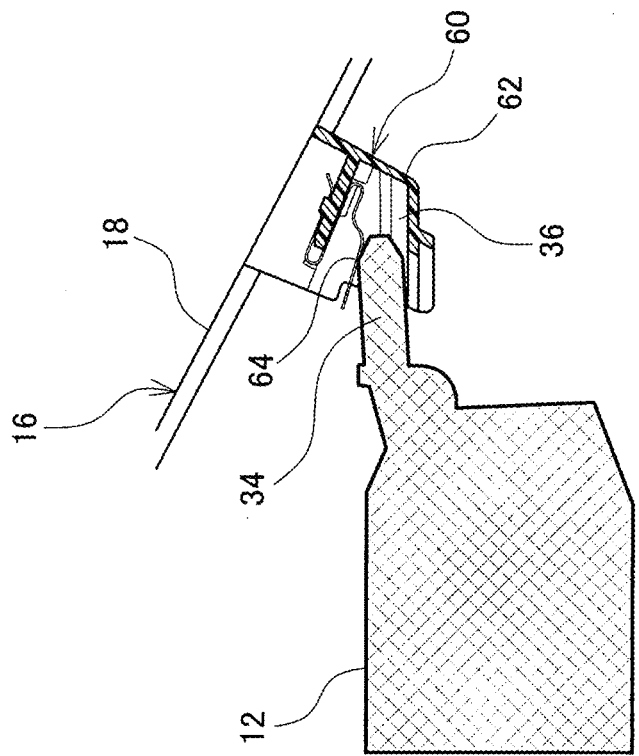
FIG. 15B is a view showing a method of attaching the casing to the bracket.
Figure 15A:
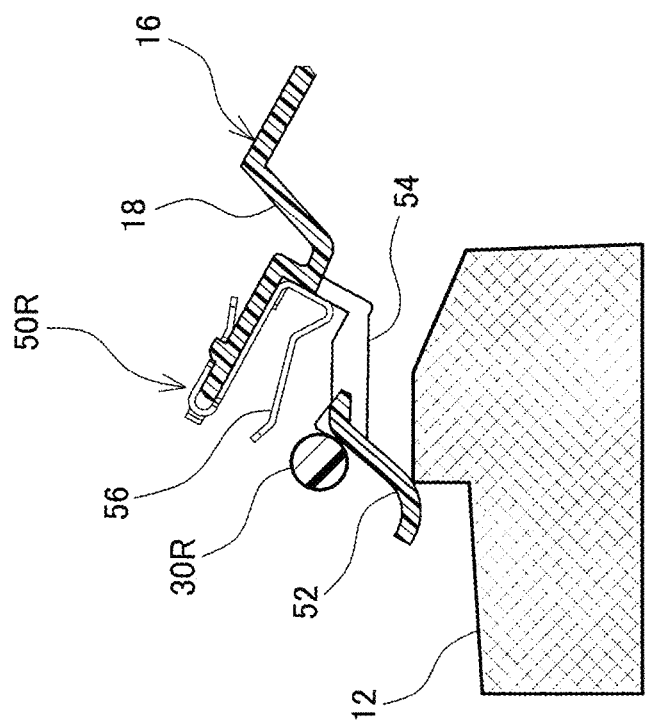
FIG. 15A is a view showing a method of attaching the casing to the bracket.
Figure 16B:
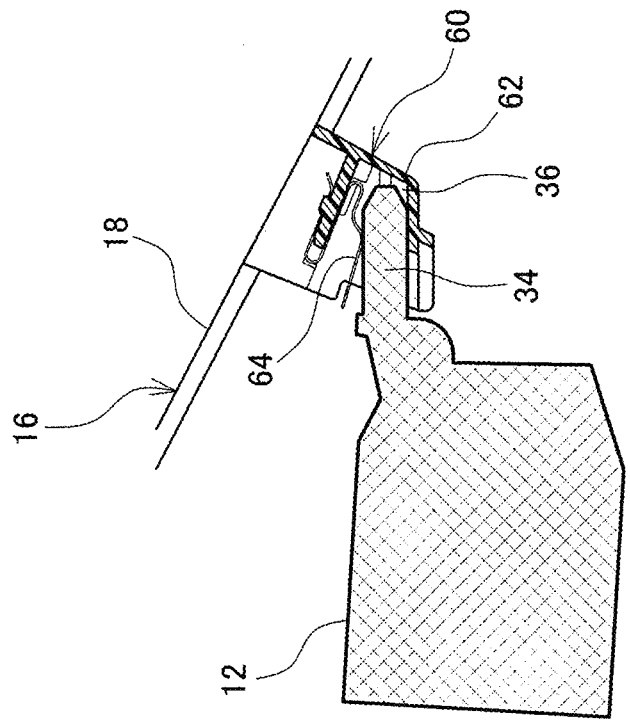
FIG. 16B is a view showing a method of attaching the casing to the bracket.
Figure 16A:
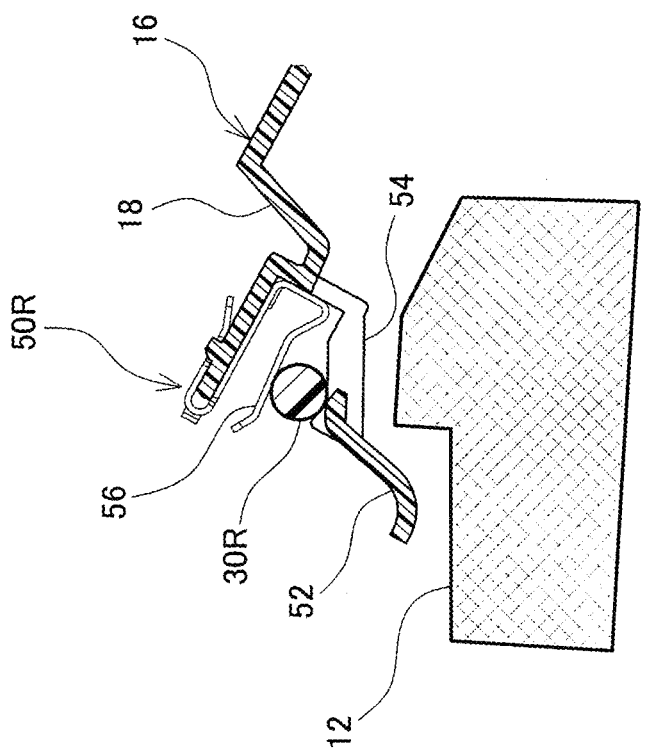
FIG. 16A is a view showing a method of attaching the casing to the bracket.

FIG. 13B, FIG. 14B, FIG. 15B, and FIG. 16B schematically show a cross section when the in-vehicle camera unit 10 is cut at the position of the line CC of FIG. 3. Each of the pair of FIG. 13A and FIG. 13B, the pair of FIG. 14A and FIG. 14B, the pair of FIG. 15A and FIG. 15B, and the pair of FIG. 16A and FIG. 16B shows a state at the same stage of attaching. As shown in FIG. 13A and FIG. 13B, when the right shaft 30R and the left shaft 30L are placed on the right and left temporary shaft placement pieces 52, the casing 12 is in a state where the tip end of the fulcrum rod 34 is located behind the reception hole 36. As shown in FIG. 14A and FIG. 14B, after rotating the casing 12 about the right shaft 30R and the left shaft 30L such that the fulcrum rod 34 is directed upward, the worker pushes the casing 12 forward and upward (toward the bracket 16) to insert the fulcrum rod 34 into the reception hole 36 of the fulcrum support structure 60. As a result, as shown in FIG. 15A, FIG. 15B, FIG. 16A, and FIG. 16B, the right shaft 30R moves forward and upward while sliding on the upper surface of the temporary shaft placement piece 52 of the shaft fixing structure 50R, and enters between the arm portion 54 and the shaft spring piece 56 in the shaft fixing structure 50R. Similarly, the left shaft 30L moves forward while sliding on the upper surface of the temporary shaft placement piece 52 of the shaft fixing structure 50L, and enters between the arm portion 54 and the base portion 18 in the shaft fixing structure 50L. Even when the fulcrum rod 34 is inserted into the reception hole 36 of the fulcrum support structure 60, the fulcrum rod 34 is swingable inside the reception hole 36. Therefore, the fulcrum rod 34 and the fulcrum support structure 60 do not interfere with the movement of the right shaft 30R and the left shaft 30L.

As shown in FIG. 16A and FIG. 16B, when the fulcrum rod 34 is pushed into the deepest portion of the reception hole 36, the fulcrum rod 34 is inserted between the fulcrum spring piece 64 and the inner surface of the semi-cylindrical portion 62, and the fulcrum rod 34 is supported by the fulcrum support structure 60. At the same time, the left shaft 30L and the right shaft 30R are fixed to the shaft fixing structures 50L and 50R, respectively. That is, the left shaft 30L is placed between the shaft spring piece 56 and the arm portion 54 of the shaft fixing structure 50L, and the left shaft 30L is fixed to the shaft fixing structure 50L. The right shaft 30R is placed between the shaft spring piece 56 and the arm portion 54 of the shaft fixing structure 50R, and the right shaft 30R is fixed to the shaft fixing structure 50R. As a result, the casing 12 is fixed to the bracket 16.

Thus, the in-vehicle camera unit 10 according to the embodiment of the present disclosure has an in-vehicle camera fixing structure including the casing 12 that supports the camera and the bracket 16 that holds the casing 12 below. The bracket 16 includes the pair of inclined surface structures provided corresponding to the left shaft 30L and the right shaft 30R, and the pair of shaft fixing structures (50L, 50R) provided corresponding to the left shaft 30L and the right shaft 30R. The left inclined surface structure is formed by the temporary shaft placement piece 52 of the shaft fixing structure 50L, and the right inclined surface structure is formed by the temporary shaft placement piece 52 of the shaft fixing structure 50R. When the casing 12 is directed forward and the casing 12 is attached to the bracket 16, each inclined surface structure guides the left shaft 30L and the right shaft 30R forward and guides the left shafts 30L and 30R toward the bracket 16.

That is, the bracket 16 includes the fulcrum support structure 60, the left and right inclined surface structures, and the left and right shaft fixing structures (50L, 50R) as a structure for fixing the casing 12. The fulcrum support structure 60 supports the tip end portion of the fulcrum rod 34 as a bar-shaped member extending in the front-rear direction. The left and right inclined surface structures guide the left shaft 30L and the right shaft 30R upward, from the rear side toward the front side, as shaft members extending in the lateral direction. The left and right shaft fixing structures (50L, 50R) form the left and right inclined surface structures, and fix the left shaft 30L and the right shaft 30R in front of the left and right inclined surface structures.

The casing attaching method for attaching the casing 12 to the bracket 16 includes the following steps. (i) Bringing the left shaft 30L and the right shaft 30R into contact with the inclined surface structure, (ii) moving the left shaft 30L and the right shaft 30R forward and upward along the left and right inclined surface structures, (iii) causing the fulcrum support structure 60 to support the fulcrum rod 34, and (iv) fixing the left shaft 30L and the right shaft 30R to the left and right shaft fixing structures (50L, 50R).

According to such a structure or method, the casing 12 is fixed to the bracket 16 by a simple operation of placing the left shaft 30L on the temporary shaft placement piece 52 of the shaft fixing structure 50L, placing the right shaft 30R on the temporary shaft placement piece 52 of the shaft fixing structure 50R, then inserting the fulcrum rod 34 into the reception hole 36, and then pushing the casing 12 forward. The position of the casing 12 is determined by the left and right shaft fixing structures 50L and 50R and the fulcrum support structure 60, and a gap is formed between the casing 12 and the ceiling. Therefore, when the worker can view the tip end of the fulcrum rod 34, the worker can visually confirm that the fulcrum rod 34 is fixed to the fulcrum support structure 60, and the attachment work is facilitated. During the work, the left shaft 30L and the right shaft 30R are placed on the right and left temporary shaft placement pieces 52, so that the casing 12 is prevented from falling.

The embodiment in which the in-vehicle camera unit 10 is fixed to the windshield 102 of the automobile 100 has been described above. The in-vehicle camera unit 10 may be fixed to glass of another window of the automobile.

The invention claimed is:

1. An in-vehicle camera fixing structure comprising:
a casing that supports an in-vehicle camera; and
a bracket that holds the casing below, wherein
the casing includes
a middle casing and a side casing,
a fulcrum rod that protrudes forward, and
a shaft that is supported above the casing, protrudes toward a center of the casing in a lateral direction, overlapping the middle casing and spaced apart from an upper surface of the middle casing in a thickness direction perpendicular to the lateral direction, and
the bracket includes
a fulcrum support structure that swingably supports the fulcrum rod,
an inclined surface structure that guides the shaft forward and guides the shaft toward the bracket when the casing faces forward and the casing is attached to the bracket, and
a shaft fixing structure that forms the inclined surface structure and fixes the shaft in front of the inclined surface structure.

2. The in-vehicle camera fixing structure according to claim 1, wherein
the inclined surface structure is
formed by a temporary shaft placement piece extending obliquely downward and rearward from the bracket.

3. The in-vehicle camera fixing structure according to claim 2, wherein
a tip end portion of the temporary shaft placement piece warps upward.

4. The in-vehicle camera fixing structure according to claim 1, wherein
the fulcrum support structure includes
a reception hole that receives the fulcrum rod from behind, and
a fulcrum spring piece extending in a front-rear direction inside the reception hole and coming into contact with the fulcrum rod.

5. The in-vehicle camera fixing structure according to claim 1, wherein
the shaft fixing structure includes
an arm portion holding the shaft below the bracket, and
a shaft spring piece attached to the bracket and urging the shaft between the shaft spring piece and the arm portion.

6. The in-vehicle camera fixing structure according to claim 1, wherein
the shafts are coaxially arranged on left and right of the casing,
the fulcrum rod is provided in front between the shafts of left and right, and
the bracket includes
a pair of the inclined surface structures provided corresponding to the shafts of left and right, and
a pair of the shaft fixing structures provided corresponding to the shafts of left and right.

7. A casing attaching method by which a casing including a middle casing and a side casing supporting an in-vehicle camera is attached to a bracket fixed to a vehicle interior, wherein
the bracket includes
a fulcrum support structure that supports a tip end portion of a rod-shaped member extending in a front-rear direction,
an inclined surface structure that guides a shaft member, extending in a lateral direction, upward from a rear side toward a front side, and
a shaft fixing structure that forms the inclined surface structure and fixes the shaft member in front of the inclined surface structure, and
the casing attaching method comprises
bringing a shaft that is provided above the casing, protrudes toward a center of the casing in a lateral direction, overlapping the middle casing and spaced apart from an upper surface of the middle casing in a thickness direction perpendicular to the lateral direction into contact with the inclined surface structure, the shaft being the shaft member, moving the shaft forward and upward along the inclined surface structure, causing the fulcrum support structure to support a fulcrum rod protruding forward from the casing, the fulcrum rod being the rod-shaped member, and fixing the shaft to the shaft fixing structure.

\* \* \* \* \*